Oct. 3, 1961  H. G. MILLER  3,002,390
ACCELEROMETER
Filed Feb. 11, 1959  2 Sheets-Sheet 2
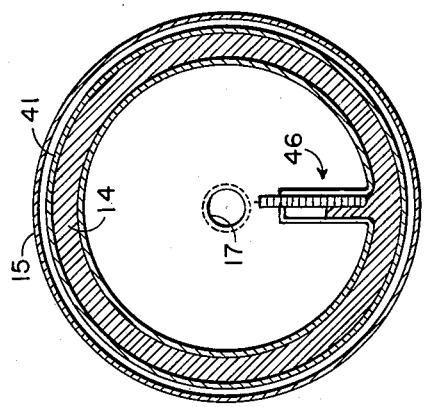
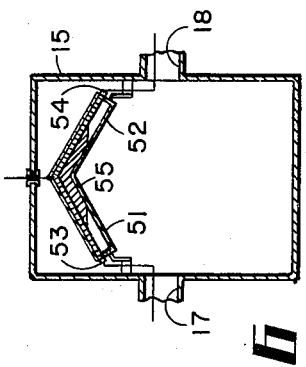
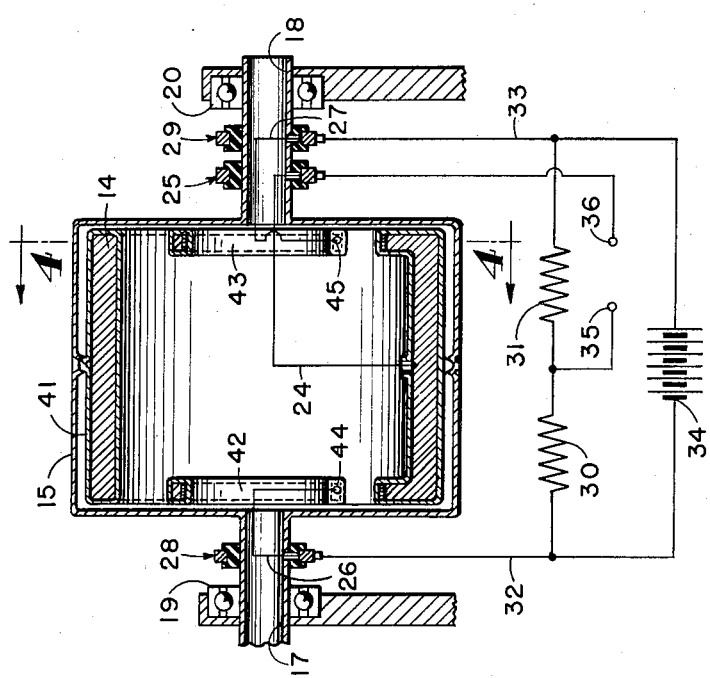
INVENTOR.
HARVEY G. MILLER.
BY
ATTORNEYS.

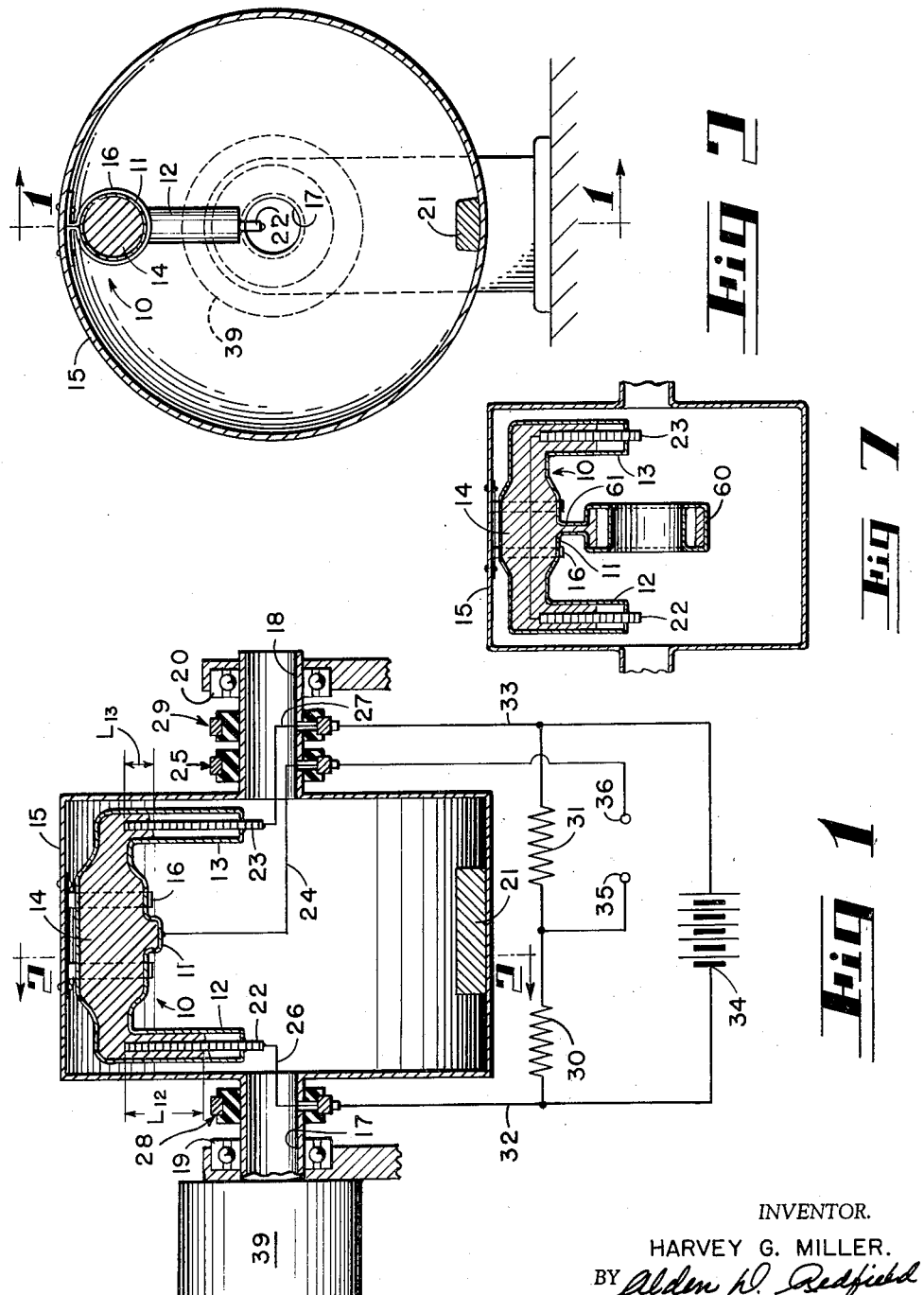

United States Patent Office

3,002,390
Patented Oct. 3, 1961

3,002,390
ACCELEROMETER
Harvey G. Miller, Nahant, Mass., assignor to Avco Manufacturing Corporation, Cincinnati, Ohio, a corporation of Delaware
Filed Feb. 11, 1959, Ser. No. 792,500
13 Claims. (Cl. 73—516)

This invention relates to fluid mass accelerometers generally and particularly to that type of fluid mass accelerometer to which centrifugal forces are imparted to provide an equivalent spring.

There is a need today for an instrument accelerometer which will withstand severe environmental conditions. For example, for use in missiles and space satellites it is not unusual that an accelerometer be required to measure ±4 $g$ with an accuracy of 1% of full range, and a natural frequency of 10 cycles per second. Moreover, these accelerometers must withstand high frequency vibrations and shocks.

Present instrument accelerometers fall short in meeting these severe environmental conditions for many reasons. First, the rigid mass devices employ mechanical springs, bellows or diaphragms which are subject to mechanical hysteresis and, thus, introduce serious errors. Also, the springs and other mechanical devices tend to crystallize and actually break at high vibration frequencies. Moreover, the mechanical arrangements of the rigid mass types of accelerometers require potentiometers which tend to wear, due to coulomb friction and, thus, introduce additional large errors. In those cases where fluid accelerometers are used in the prior art, the devices are incapable of operation at the high frequency responses required.

In accordance with this invention I overcome the deficiencies of the prior art rigid mass devices by means of an accelerometer employing a fluid mass to which a centrifugal force is imparted. As will be seen, this provides an accelerometer having what I define as an "equivalent spring" with many advantages over the known devices. For example, (1) The fluid mass accelerometer provides zero coulomb friction and, hence, there is no potentiometer wear; (2) The fluid mass accelerometer provides an "equivalent spring" which has a linear relation to the displacement of the fluid mass; (3) The equivalent spring has a "spring constant" which is fixed in value for fixed angular velocities; (4) Cross-coupling accelerating forces are cancelled out; (5) In my fluid mass accelerometer, maximum displacement at zero frequency is a function of the physical parameters and is not fixed by the "$g$" range and the undamped natural frequency; and (6) The fluid mass accelerometer is capable of withstanding severe vibration and shock.

It is, therefore, a broad object of this invention to provide an accelerometer having each of the above-described advantages over the prior art devices.

A more specific object of this invention is to provide an accelerometer comprising a fluid mass to which a centrifugal force is imparted for providing an equivalent spring.

Still another object of this invention is to provide an accelerometer comprising a fluid mass contained in an evacuated, U-shaped tube to which a centrifugal force is applied in a plane perpendicular to the direction of acceleration to be measured, the displacement of the fluid mass within the tube being a measure of the force of acceleration.

Briefly described, this invention contemplates the use of a relatively heavy fluid mass contained in a generally U-shaped hollow container or tube mounted on a rotatable shaft. The base of the U constitutes a fluid reservoir and is spaced from the shaft axis in a position parallel thereto, while the legs of the U are disposed more or less radially thereof. The shaft is driven by any suitable means at a constant angular velocity, thus imparting a centrifugal force to the fluid in a plane perpendicular to the axis and causing the fluid to flow within the tubes from the legs toward the reservoir until a state of equilibrium is reached. If the accelerometer is mounted in a vehicle moving at a constant velocity, that is, if there is zero acceleration, then equilibrium is undisturbed; however, if acceleration occurs along the shaft axis, the fluid will move axially within the hollow tubes to a new position of equilibrium. By providing means for measuring the displacement of the fluid within the tubes, and by simple calibration, I am able to accurately measure the force of acceleration.

As previously noted, many of the advantages of the centrifugal accelerometer result from the "equivalent spring" provided by the centrifugal force imparted to the fluid mass. The "equivalent spring" may be defined as the force imparted to the fluid tending to return it to its zero acceleration state of equilibrium. It is "equivalent" to the force exerted by the usual spring devices upon a conventional rigid mass employed in prior art accelerometers. The spring constant of the fluid mass accelerometer, that is, the degree of force imparted to the fluid mass by the "equivalent spring," is a function of angular velocity and the radial distance between the spin axis and the level of fluid at its zero acceleration state of equilibrium, and it will not vary as long as angular velocity and the above-mentioned radial distance are maintained constant.

For a clearer understanding of the nature and further objects of this invention, reference should now be made to the following detailed description and to the accompanying drawings, in which:

FIG. 1 represents a simplified fluid mass accelerometer made in accordance with my invention;

FIG. 2 is a section taken through line 2—2 of FIG. 1;

FIGS. 3 and 4 represent a modified form of my invention;

FIG. 5 is a sectional view of another modification of my invention;

FIG. 6 is still another modified embodiment of my invention; and

FIG. 7 is a modification of my invention illustrating a means for compensating for temperature changes.

The simplified fluid mass accelerometer illustrated in FIG. 1 comprises a generally U-shaped hollow fluid container generally designated at 10 and consisting of a hollow elongated base portion or reservoir 11 which is parallel to the spin axis and has two generally radial legs 12 and 13, the extended center lines of which intersect the spin axis at equal angles. For maintaining a linear equivalent spring, it is important that the cross-sectional areas of these legs be equal. A quantity of conducting fluid 14 is confined within the container 10 and, under operating conditions, entirely fills the reservoir 11 and partially fills each of the legs 12 and 13. Preferably, the container 10 is constructed of an electrical insulating material, such as glass, but a conductive metal may be used provided proper insulation is employed at appropriate points. Also, since a relatively heavy mass is required, a conducting fluid such as mercury is preferred; but other materials may be equally suitable under predetermined conditions. Further, in order that the fluid mass accelerometer may have a large displacement, the length and the cross-sectional area of the reservoir 10 must be much greater than the length and the cross-sectional area of the legs.

It will be recognized that cross-coupling accelerating forces will be present and that these forces are sinusoidal functions. The amplitude of the sinusoidal function is proportional to the radial distance between the levels of the fluid in legs 12 and 13. Thus, when there is zero acceleration along the spin axis, the cross-coupling acceleration forces are zero. The frequency of this sinusoidal function is determined by the angular velocity of the body revolution. The angular velocity in revolutions per second is proportional to the undamped natural frequency and the physical configuration of the reservoir 11 and the legs 12 and 13. This physical configuration of the reservoir and the legs may be such that the angular velocity (radians per second) may be made greater than the undamped natural frequency, and the cross-coupling acceleration forces are greatly attenuated or essentially canceled out.

The container 10 is housed within a cylindrical casing 15 and may be securely fastened to the inner wall thereof by means of straps 16 or other suitable devices. The cylindrical casing 15 is provided at its axis with hollow cylindrical shafts 17 and 18 suitably mounted for rotation on fixed bearings 19 and 20, respectively. For the purpose of counter-balancing the system, a weight 21 is secured in any suitable manner on the diametrically opposed inner surface of the casing 15.

For a purpose hereinafter to be described, resistance elements 22 and 23 are inserted into the legs 12 and 13, respectively, of the container 10, and the container is then evacuated and sealed. If the container 10 is not constructed of an insulating material, then it is necessary that the elements 22 and 23 be insulated from the container at the points of insertion. The specific construction of the resistance elements 22 and 23 forms no part of this invention and, hence, these elements are shown diagrammatically. However, it is required that these elements be of the type that portions may be shorted out when contacted by a conductor, and for this purpose a bare wire-wound resistor or a carbon resistor may be used. One end of an electric conducting wire 24 is inserted through the outer wall of the container 10 to establish a permanent contact with the conducting fluid 14 and the other end is connected to a conventional slip ring 25 mounted on shaft 18. Similarly, electric conducting wires 26 and 27 are connected from the resistance elements 22 and 23 to the slip rings 28 and 29, respectively.

As will be seen, the resistance elements 22 and 23 form two legs of a Wheatstone bridge, while series-connected identical resistors 30 and 31 of a conventional type are connected by electric wires 32 and 33 to the slip rings 28 and 29, respectively, and provide the third and fourth branches of the bridge. A battery 34 or other source of potential is connected across the resistors 30 and 31; and output voltages, if any, are derived from the terminals 35 and 36 connected between the slip ring 25 and the junction of resistors 30 and 31. The entire apparatus is rotated on its axis by means of a constant speed motor 39.

When the casing 15 is rotated on the common axis of shafts 17 and 18, the container 10 revolves about the axis at a high rate of speed and the centrifugal forces acting on the fluid 14 tend to displace the fluid mass axially from the legs 12 and 13 into the reservoir 11. If the legs 12 and 13 are identical in shape and size, and if we assume that there are no forces other than the centrifugal force acting on the fluid, then an original state of equilibrium will exist when the columns of fluid in legs 12 and 13 are of equal length. Under these circumstances, equal lengths of the resistance elements 22 and 23 will be shorted out by the columns of conducting fluid 12 and 13 and, hence, the effective resistance of the elements 22 and 23 will be equal. Since the resistance elements 22 and 23 are connected in a balanced Wheatstone bridge with the resistors 30 and 31, a zero voltage output will be derived from the terminals 35 and 36. On the other hand, if the original equilibrium is disturbed by other forces, such as accelerating forces along the spin axis, then the fluid mass will be axially displaced and the length of the columns of fluid in legs 12 and 13 will be unequal. Hence, the effective resistance of the elements 22 and 23 will be unequal to yield a finite output voltage across the terminals 35 and 36. Thus, if the fluid mass accelerometer device illustrated is mounted in a vehicle which is accelerating in a direction parallel to the spin axis of the accelerometer, the conducting fluid will be displaced, and the amount of acceleration is directly proportional to the amount of displacement of the fluid.

The illustrated accelerometer is capable of accurately measuring accelerating forces along the spin axis and, in addition, it has the advantage over the prior art rigid mass accelerometers of automatically cancelling cross-accelerating forces. This is to say, where there are accelerating forces in a direction perpendicular to the spin axis, equal forces are applied to the fluid in each of the legs 12 and 13 and, hence, these cross-accelerating forces are cancelled out. Moreover, the fluid mass accelerometer eliminates coulomb friction between the conductor (the fluid mass) and the potentiometer devices, thus eliminating potentiometer wear due to friction, and prolonging the life and accuracy of the accelerometer. Another advantage over the prior art spring or other mechanical type of accelerometers is the absence of the inherent mechanical hysteresis which introduces large errors depending upon the operating frequencies and the g-range and, further, continual vibration which eventually produces a permanent distortion, thus destroying the accuracy of the prior art devices, does not affect my fluid mass accelerometer. Also, the spring constant of a rigid mass type accelerometer is a function of the material used, its age, temperature and many other factors which will vary in mass production. In my device, however, the spring constant is a function of the angular velocity of the device and the radial distance between the spin axis and the fluid level at zero acceleration, and this function is maintained essentially constant throughout the entire life of the device. Similarly, g-range and natural frequency are functions of easily controlled physical parameters.

A second embodiment of my invention having similar advantages is illustrated in FIGS. 3 and 4 to which reference is now made. Generally, this embodiment operates in the same manner as that illustrated in FIGS. 1 and 2. It is structurally different in that the tubular reservoir 11 of FIGS. 1 and 2 is replaced by an annular reservoir 41 and the legs 12 and 13 are replaced by legs 42 and 43 which are shaped in the form of natural logarithmic spirals positioned in planes perpendicular to the spin axis of the accelerometer. Potentiometer devices 44 and 45 having corresponding shapes are inserted, respectively, in legs 42 and 43.

The use of the annular reservoir 41 is a feasible way of obtaining a larger cross-sectional area for the reservoir, and eliminates the necessity for balancing. Also, the flywheel effect provided by the increased and uniformly distributed fluid mass lends stability to the accelerometer.

The arrangement of the legs 42 and 43 in a natural logarithmic spiral permits the use of a much longer leg, thus increasing the g-range of the device. Since the length of a natural logarithmic spiral leg bears a linear relation to its radial length, problems of non-linearity are not introduced; it is important, however, that the arc length of both legs must be equal. The use of natural logarithmic spirals is also a very feasible method of increasing the ratio of the arc length to the radial length which is needed to greatly attenuate or cancel out the cross-acceleration forces.

The embodiment illustrated in FIG. 5 is identical to that illustrated in FIGS. 3 and 4, with the single exception that the logarithmic spiral legs 42 and 43 are replaced by straight radial legs, such as are indicated at 46. Such an arrangement is useful when an increased g-range is not required.

Still another embodiment of this invention is illustrated in FIG. 6. This embodiment employs a V-shaped tube having legs 51 and 52, but no reservoir. As before, resistive elements 53 and 54 are inserted in the respective legs 51 and 52 and the evacuated tubes are partially filled with the fluid mass 55. A centrifugal force is imparted as before, and the function of this apparatus is essentially the same as that described in the embodiments of FIGS. 1–5, but it will be recognized that in such an arrangement the g-range of the accelerometer will be limited. While a V-shaped container is illustrated, it is clear that any curved tube may be employed.

As was noted previously, the equivalent spring constant of the fluid mass accelerometer is a function of angular velocity and the radial distance of the fluid level from the spin axis. So long as angular velocity and radial distance do not change, the equivalent spring constant will not change. Angular velocity may be accurately regulated by many known constant speed devices. However, the fluid level may change with changes in temperature, particularly if fluid masses such as mercury are used, since mercury materially changes in volume with changes in temperature, thus raising or lowering the fluid level. To obtain a uniform fluid level, I provide the temperature-compensation device illustrated in FIG. 7. While this device is described in conjunction with the embodiment of my accelerometer illustrated in FIG. 1, it is to be understood that the same temperature-compensation device is intended for use with each of the embodiments. My temperature compensator illustrated comprises an annular auxiliary reservoir 60 connected to the main reservoir 11 by means of a tube 61 located midway between the legs 12 and 13. For a purpose hereinafter to be described, the tube 61 has a much smaller cross-sectional area than the cross-sectional area of legs 12 and 13.

When there is zero acceleration along the spin axis, the fluid in the annular reservoir 60 and in legs 12 and 13 will, in time, approach the same level and, therefore, the free surfaces of the fluid in the reservoir 60 and in the legs 12 and 13 will be at the same radial distance from the spin axis. As the temperature changes, there will be a corresponding change in volume of the fluid, and this change in volume will distribute itself in the reservoir 60 and in the legs 12 and 13 in a manner proportional to the respective cross-sectional areas. Since the reservoir 60 has a much larger cross-sectional area than the cross-sectional areas of legs 12 and 13, most of the increased volume will be distributed in the reservoir 60 rather than in the legs 12 and 13; and since the reservoir 60 has a much smaller radial length than the legs 12 and 13, even a large change in volume of the fluid in the reservoir 60, due to a large change in temperature, will produce a very small change in the radial distance of the fluid level from the spin axis. Therefore, the equivalent spring constants will be substantially independent of temperature changes. Moreover, because of the very loose coupling between the reservoir 11 and the reservoir 60, due to the very small cross-sectional area of the tube 61, the linearity of the equivalent spring will not be materially affected by the use of the reservoir 60.

In the embodiments of FIGS. 3 and 5, the identical temperature compensator may be employed; that is, the reservoir 60 may be connected by means of tube 61 to the reservoir 41 at a point midway between the legs 42 and 43 (of FIG. 3) and the legs 46 (of FIG. 5). In the embodiment of FIG. 6 the tube 61 may be connected at the junction of legs 51 and 52.

It is apparent that many adaptations and modifications may be made by persons skilled in the art. For example, the shape of the containers may be varied to obtain many diverse results; thus, the reservoirs and the legs together may comprise a simple or compound curve. Also, the several arrangements for containing the fluid mass may be varied without departing from the spirit of this invention. It is my intention, therefore, that the invention be limited only by the scope of the following claims, as interpreted in the light of the prior art.

What is claimed is:

1. In an accelerometer for measuring the forces of acceleration along an axis, the combination comprising: a fluid mass; a fluid container spaced from said axis, and having axially spaced tubular portions extending generally radially toward said axis, the end of said tubular portions toward said axis being sealed, said fluid mass being contained by said container and entirely filling said container except for said tubular portions, said tubular portions being partially filled by said fluid mass; means for rotating said container about said axis at a uniform velocity for imparting a constant centrifugal force to said fluid mass, whereby said fluid mass assumes a first position of equilibrium in said container; and means for measuring the amount of displacement of said fluid mass from said first position resulting from a force of acceleration along said axis.

2. The invention as defined in claim 1 wherein said fluid mass comprises a conducting fluid, and wherein said means for measuring the amount of displacement of said fluid mass comprises an exposed impedance element extending into each of said tubular portions whereby portions of said impedance elements are short-circuited by said fluid mass; and electric circuit means for measuring the relative change in said impedance elements due to the displacement of said fluid resulting from a force of acceleration.

3. The invention as defined in claim 1 wherein temperature-compensating means are provided for maintaining constant the level of said fluid in said tubular portions as the volume of said fluid mass changes due to changes in temperature.

4. The invention as defined in claim 3 wherein said temperature-compensating means comprises an annular chamber coaxially disposed for rotation about said axis and a tube having a small cross-sectional area as compared with the cross-sectional area of said tubular portions connecting the interior of said container with said annular chamber.

5. In an accelerometer for measuring the forces of acceleration along an axis, the combination comprising: a fluid mass; an elongated container partially filled with said fluid mass, said container being displaced from said axis and comprising an elongated reservoir disposed generally parallel to said axis and having first and second tubular portions located at the respective ends of said reservoir, said tubular portions extending generally radially toward said axis and being sealed at the end toward said axis; means for rotating said container about said axis at a uniform velocity for imparting a constant centrifugal force to said fluid mass, whereby said fluid mass assumes a first position of equilibrium in said container, entirely filling said reservoir and partially filling said first and second tubular portions; and means for comparing the amount of displacement of said fluid mass from said first position of equilibrium in said first tubular portion with the displacement of said fluid mass from said first position of equilibrium in said second tubular portion resulting from a force of acceleration along said axis.

6. The invention as defined in claim 5 wherein said container is U-shaped and consists of a base and two legs, said base comprising said reservoir, and said two legs comprising said first and second tubular portions, respectively.

7. The invention as defined in claim 5 wherein said reservoir is annular and is concentric of said axis.

8. The invention as defined in claim 5 wherein said leg portions are spiral-shaped.

9. The invention as defined in claim 5 wherein said fluid mass comprises a conducting fluid, and wherein said means for measuring the amount of displacement of said fluid mass comprises an exposed impedance element extending into each of said first and second tubular portions, whereby portions of said impedance elements are short-circuited by said fluid mass; and electric circuit means for measuring the relative change in said impedance elements due to the displacement of said fluid resulting from a force of acceleration.

10. The invention as defined in claim 5 wherein temperature-compensating means are provided for maintaining constant the level of said fluid in said tubular portions as the volume of said fluid mass changes due to changes in temperature.

11. The invention as defined in claim 10 wherein said temperature-compensating means comprises an annular chamber coaxially disposed for rotation about said axis and a tube having a small cross-sectional area as compared with the cross-sectional area of said tubular portions connecting the interior of said container with said annular chamber.

12. In an accelerometer for measuring the forces of acceleration along an axis, the combination comprising: a fluid mass; a V-shaped fluid container, the apex of said container being spaced from said axis and the legs of said container being tubular and extending from the apex toward said axis, the end of said tubular legs toward said axis being sealed, said container being partially filled with said fluid mass; means for rotating said container about said axis at a uniform velocity for imparting a constant centrifugal force to said fluid mass, whereby said fluid mass assumes a first position of equilibrium in said container; and means for measuring the amount of displacement of said fluid mass from said first position resulting from a force of acceleration along said axis.

13. In an accelerometer for measuring the forces of acceleration along an axis, the combination comprising: a fluid mass; a fluid container spaced from said axis, and having axially spaced tubular portions located at the extreme axial ends of the container extending generally radially toward said axis, the end of said tubular portions toward said axis being sealed, said container being partially filled with said fluid mass; means for rotating said container about said axis at a uniform velocity for imparting a constant centrifugal force to said fluid mass, whereby said fluid mass assumes a first position of equilibrium in said container; and means for measuring the amount of displacement of said fluid mass from said first position resulting from a force of acceleration along said axis.

References Cited in the file of this patent

UNITED STATES PATENTS

| 1,317,072 | Carlier | Sept. 23, 1919 |
| 2,319,940 | Marrison | May 25, 1943 |
| 2,386,777 | Bentley, Jr. | Oct. 16, 1945 |

FOREIGN PATENTS

| 347,808 | Great Britain | May 7, 1931 |